United States Patent [19]

Feniger

[11] 4,287,985
[45] Sep. 8, 1981

[54] EYEGLASS CASE

[76] Inventor: Arnold R. Feniger, 415 E. 52 St., New York, N.Y. 10022

[21] Appl. No.: 169,662

[22] Filed: Jul. 17, 1980

Related U.S. Application Data

[63] Continuation-in-part of Ser. No. 104,149, Dec. 17, 1979, abandoned.

[51] Int. Cl.[3] ............................................. A45C 11/04
[52] U.S. Cl. .......................................... 206/5; 206/38; 206/233
[58] Field of Search ............................. 206/5, 38, 233

[56] References Cited

U.S. PATENT DOCUMENTS

| | | | |
|---|---|---|---|
| 1,242,187 | 10/1917 | Hayden | 206/5 |
| 2,650,700 | 9/1953 | Wolf | 206/5 |
| 2,784,837 | 3/1957 | Marks | 206/5 |
| 3,921,797 | 11/1975 | Platt | 206/5 |

Primary Examiner—William T. Dixson, Jr.
Attorney, Agent, or Firm—Marvin Feldman; Stephen E. Feldman

[57] ABSTRACT

An eyeglass case is disclosed wherein the eyeglass lenses may be cleaned without need for the fingers to touch the lenses. The eyeglass case construction permits the user to insert his fingers to clean the lenses without the fingers in direct contact with the lenses. The case construction is of low cost, disposable material so that after exhaustion of the cleansing surfaces, the case may be disposed and a fresh case utilized. In one embodiment the case surface itself provides a lens cleansing surface.

6 Claims, 7 Drawing Figures

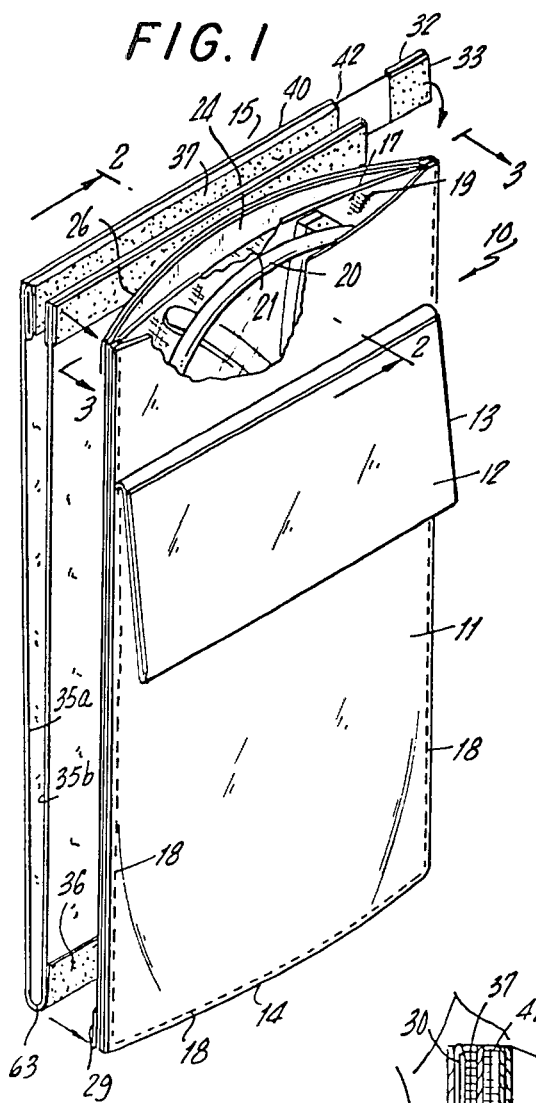
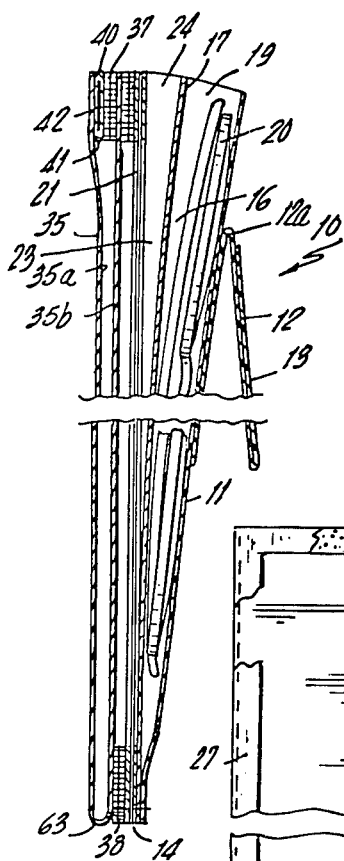
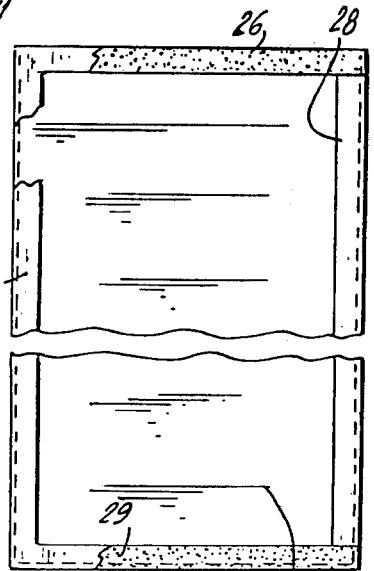
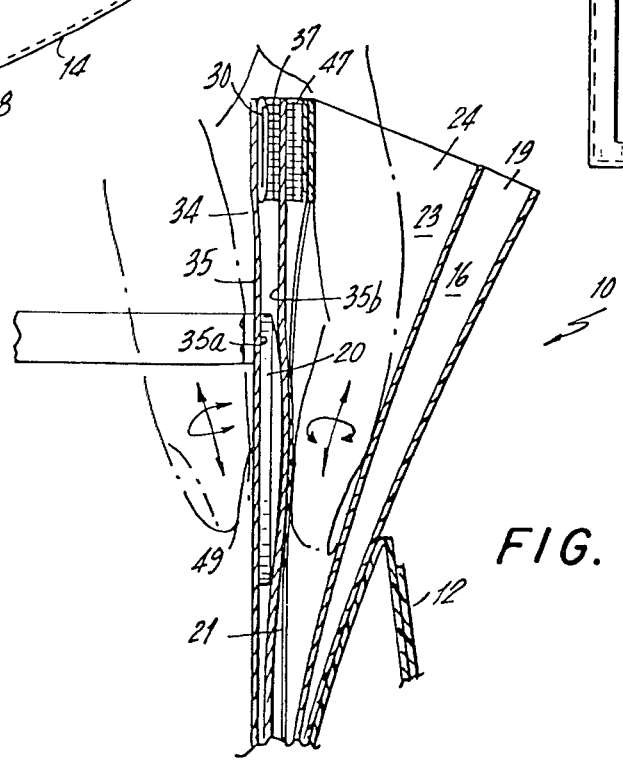

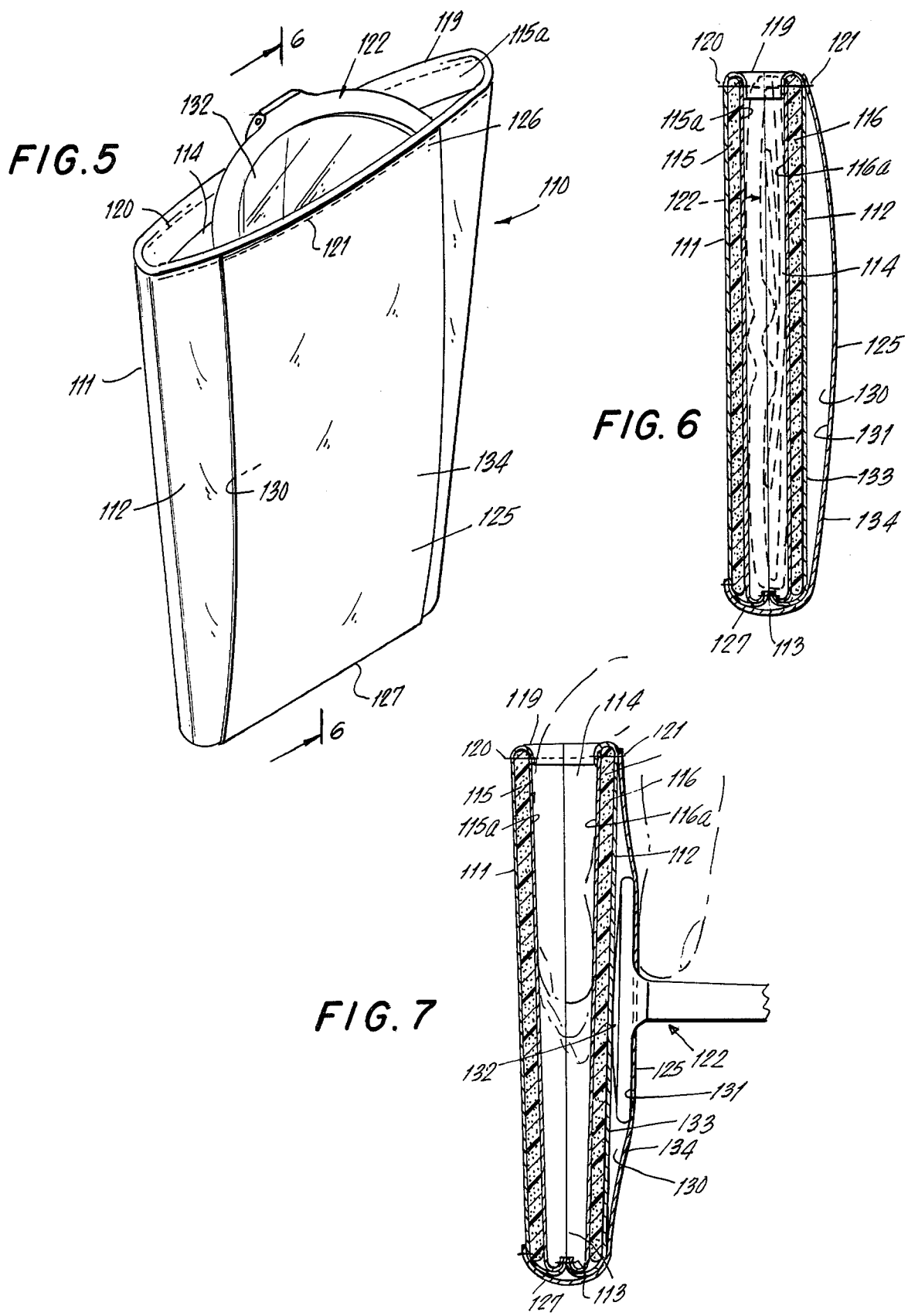

EYEGLASS CASE

RELATED U.S. APPLICATIONS

This is a continuation-in-part application of U.S. Ser. No. 104,149 filed Dec. 17, 1979 now abandoned.

FIELD OF THE INVENTION

This invention relates to eyeglass cases. More specifically, this invention relates to eyeglass cases which provide for cleaning of the eyeglass lenses.

BACKGROUND AND DISCUSSION OF PRIOR ART

Heretofore it was known in the art to attach cleaning cloths or tissues to an eyeglass case, and with opening of the case, the eyeglasses and cleaning tissues would then be removed from the case and used as one would normally use a cleaning sheet. Typical of such prior construction are U.S. Pat. Nos. 410,798 to C. R. Long; 1,025,372 to H. V. Conrad; 1,105,069 to E. F. Flanagan; 1,242,187 to H. A. Hayden; 2,332,266 to H. R. Segal; 2,522,909 to F. F. Wadanoli; 2,554,630 to J. R. Miller and 3,921,797 to S. S. Platt.

While such prior art constructions permitted lens cleaning, the eyeglass case had to be opened and generally, the eyeglasses had to be extensively handled in an attempt to engage the lenses with the cleaning cloth or tissue. Another drawback was that the cleaning tissues, unless contained within a closed case would be readily subject to being lost. Further, it was generally difficult to make a combination of case and cleaner of sufficiently inexpensive construction so as to be disposable in its entirety, and the art was therefore directed to replacement of the cloths or tissues or provision of a large plurality of same within the body of the case.

Now there is provided by the present invention an eyeglass case construction which permits cleaning of the lenses without removal of tissues from the case, and without handling the lenses, and yet lends itself to disposability of the entire case with depletion of the cleaning surfaces.

It is therefore a principal object of the present invention to provide an improved eyeglass case which permits cleaning of the eyeglass lenses without removal of the cleaning elements from the case body.

It is another object of the present invention to provide an eyeglass case as aforesaid wherein the case in its entirety is readily disposable.

It is a still further object of this invention to provide an eyeglass case wherein the lenses may be cleaned without direct contact with the fingers.

It is still a further object of this invention to provide a case as aforesaid which both protects the eyeglasses and yet is sufficiently flexible to be stored in a pocket.

It is still a further object of this invention to provide an eyeglass case as aforesaid which is made of low cost, inexpensive materials and yet is safe and practical in use.

The aforesaid as well as other objects and advantages as will become apparent from a reading of the following description, the adjoined claims and the drawings in which;

FIG. 1 is a perspective exploded view of the eyeglass case containing a pair of eyeglasses;

FIG. 2 is a sectional view taken along line 2—2 of FIG. 1;

FIG. 3 is a sectional view taken along line 3—3 of FIG. 2;

FIG. 4 is a sectional view showing the glasses being cleaned;

FIG. 5 is a rear perspective view of another embodiment of the invention;

FIG. 6 is a sectional view taken along line 6—6 of FIG. 5; and

FIG. 7 is a sectional view showing the glasses being cleaned.

Referring to the FIGS. 1-4, there is shown the eyeglass case of the present invention generally referred to as numeral 10. Case 10 comprises a front plastic member 11 with a clear plastic flat 12 which flat has sleev 13 for receiving a card such as an identification card (not shown). The underside fold 12a of flat 12 can engage the top pocket edge (not shown) of the user when the bottom 14 of case 10 is inserted into a shirt or coat pocket. At the top 15 of case 10, there is a pocket 16 formed by cloth 17 attached to member 11 on three sides by stitching 18 or other suitable bonding means. Pocket 16 has a slot 19 into which a pair of folded eyeglasses 20 is received so as to reside in pocket 16.

A flexible sheet of stretchable rubber 21 such as surgical rubber, is attached to the opposite side 22 of cloth 17 by stitching 18 on three sides so as to form a second pocket 23. Pocket 23 is formed with slot 24 at the top so as to receive the fingers of the user for purposes hereinafter more fully explained.

A Velcro portion 25 is attached by suitable bonding means to rubber sheet 21 at the top 26, sides 27, 28 and bottom 29. And a flexible metal hinge 30 is fixedly mounted to case edge 31 by suitable bonding means. The other end 32 of hinge 30 is formed with a Velcro pad 33 for contacting top Velcro portion 26, so that hinge 31 is selectively attachable to the back 34 of the case.

A cleaning cloth 35 is folded on itself at 36 and 40 so as to form a transverse open pocket 37. Surfaces 35a and 35b of cloth 35 are specifically treated such as with silicone and serve as cleaning surfaces. A pair of Velcro bands 37 and 38 are attached to surface 39 of cloth 35 and the top and bottom thereof respectively. Fold 40 is formed with stitching 41 so as to form a sleeve 42 into which hinge 30 is slidably received. Bands 37 and 38 are releasably attached to respective portions of Velcro sections 26, 27, 28 and 29 with free edge 47 being selectively attached on the back of the case, so that the size of pocket 37 is adjustable, for purposes hereinafter appearing.

In use, the folded eyeglasses are removed from pocket 16 and the eyeglasses unfolded. The eyeglasses lens 48 is then inserted into cleaning pocket 37 and held by fingers such as the thumb, on cloth surface 49. The other fingers, such as the middle fingers of the user are inserted into a second pocket 23 with the tips of the finger pressingly engaging rubber sheet 21 which in turn, presses against cloth surface 39. The movement of the fingers causes cleaning surface 35b to contact the lenses. With rubbing of the rubber sheet the lens is thus effectively cleaned without having to contact the lense with the finger and without having to remove the cleaning cloth from the back of the case.

In another preferred embodiment of the invention, front plastic member 11 may be removed and second pocket 23 sized to receive the eyeglasses as well as, alternatively, the fingers of the user.

Also, it is to be borne in mind that the respective sheet members, to wit, top plastic sheet, intermediate cloth (optional) rubber sheet, and cleaning cloth surfaces may be fixedly inexpensively stitched to each other, while still forming the necessary pockets. In this manner of construction, the eyeglass case lends itself to ready disposal after exhaustion of the cleaning surfaces.

In a preferred construction the top plastic sheet may be less flexible than the other sheet so as to form a protective cover when the case is inserted in the user's pocket.

Referring to FIGS. 5-7 there is shown another embodiment of the present invention, namely an eyeglass case referred to generally by numeral 110. Case 110 comprises a front outer cloth 111 and a rear outer cloth 112 which are stitched on three sides by stitching 113 (typical) so form a pocket 114. A pair of upright foam rubber members 115 and 116 are in turn stitched to outer cloths 111 and 112, as well as to inner clothers 115,116 so as to complete the eyeglass pocket 114. Cloths 111 and 112 overlay inner cloths 115, 116 at the top 119 and are stitched sheets by stitching 120 and 121.

Pocket 114 is wide enough to accomodate a pair of folded eyeglasses 122. It is to be noted however that the case 110 and pocket 114 are tapered upwardly so that top 119 is wider than the bottom 123. This tapered construction permits the four fingers opposing the thumb to be inserted into the empty pocket 114 for purposes hereinafter appearing.

A silicone treated cleaning cloth 125 is stitched to the rear of case 110 as at top 126 and bottom 127 so as to form a transverse through slot or pocket 130. The inner surface 131 of cloth 125 and particularly the outer surface 133 of rear cloth 112 are silicone treated so as to provide lens cleaning surfaces.

As best seen in FIG. 7, the eyeglasses may be removed from the case and unfolded with the lens 132 placed between surfaces 131 and 133. The four fingers are then inserted in the case and the thumb placed against the outer surface 134 of rear cloth 112. In this manner by the rubbing action of the thumb and opposed fingers the eyeglass lens is cleaned.

It is to be noted that the foam rubber member 116 is sufficiently soft and flexible to provide good cleaning contact action by the cloths or sheets 125 and 112.

The bottom of case being tapered down is sufficiently narrow to be inserted into a conventional sized pocket.

While the present invention has been described herein with reference to particular embodiments thereof, a latitude of modification, various changes and substitutions are intended in the foregoing disclosure, and in some instance some features of the invention will be employed without a corresponding use of other features without departing from the scope of the invention as set forth.

What I claim is:

1. An eyeglass case comprising a case being formed of flexible sides and with a pocket for receiving a pair of folded eyeglasses, a cleaning sheet attached to one side of said case, and a second cleaning sheet being attached adjacent to said first cleaning sheet and forming a second pocket therewith, said second pocket being transversely disposed to said first pocket and wherein one surface of said second sheet is facingly disposed to one surface of the first sheet, attaching means wherein said second sheet is fixedly attached to the case at the top and bottom of the case to form said second pocket, whereby the eyeglasses may be removed from said first pocket and unfolded and the lens of the unfolded glasses inserted in said second pocket to be engaged by opposed surfaces of the cleaning sheets with the fingers in the first pocket and the thumb pressing the second sheet so that the cleaning sheets are pressed against the lens and said case being tapered so as to permit the fingers opposing the thumb to be inserted in said first pocket for cleaning the lens.

2. The eyeglass case of claim 1, said case further comprising a soft foam material so as to be readily pressed by said fingers in said first pocket to press said first sheet.

3. The eyeglass case of claim 2, wherein said material further comprising foam rubber.

4. The eyeglass case of claim 1, wherein said cleaning sheets are silicone treated cloths.

5. The eyeglass case of claim 1, wherein said attaching means is by stitching.

6. The eyeglass case of claim 1, said first cleaning sheet being formed so as to comprise the outside covering of said case.

* * * * *

UNITED STATES PATENT AND TRADEMARK OFFICE
CERTIFICATE OF CORRECTION

PATENT NO. : 4,287,985
DATED : September 8, 1981
INVENTOR(S) : ARNOLD FENIGER

It is certified that error appears in the above—identified patent and that said Letters Patent is hereby corrected as shown below:

IN THE COVER PAGE

In the patentee's address, change:

"415 E. 52 St., New York, N.Y. 10022"

to read

-- 80-62 249th Street,
Bellerose, Queens, New York 11426 --.

In the Related U. S. Application Data, change:

"abandoned"

to read

-- now U. S. Patent No. 4,269,306,
issued May 26, 1981.--

Signed and Sealed this

Eighth Day of December 1981

[SEAL]

Attest:

GERALD J. MOSSINGHOFF

Attesting Officer        Commissioner of Patents and Trademarks